United States Patent
Cronin et al.

(10) Patent No.: US 11,062,288 B2
(45) Date of Patent: *Jul. 13, 2021

(54) SECURING CONTACTLESS PAYMENT

(71) Applicant: BLAZER AND FLIP FLOPS, INC., San Diego, CA (US)

(72) Inventors: John Cronin, Bonita Springs, FL (US); Seth Melvin Cronin, Clarksville, TN (US)

(73) Assignee: BLAZER AND FLIP FLOPS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,677

(22) Filed: Feb. 8, 2019

(65) Prior Publication Data

US 2019/0172035 A1 Jun. 6, 2019

Related U.S. Application Data

(63) Continuation of application No. 14/970,328, filed on Dec. 15, 2015, now Pat. No. 10,262,311.

(60) Provisional application No. 62/093,028, filed on Dec. 17, 2014.

(51) Int. Cl.
    *G06Q 20/20* (2012.01)
    *G06Q 20/32* (2012.01)
    *G06Q 20/10* (2012.01)
    *G06Q 20/00* (2012.01)

(52) U.S. Cl.
    CPC .......... *G06Q 20/202* (2013.01); *G06Q 20/00* (2013.01); *G06Q 20/102* (2013.01); *G06Q 20/3278* (2013.01)

(58) Field of Classification Search
    CPC .. G06Q 20/202; G06Q 20/00; G06Q 20/3278; G06Q 20/102
    USPC .......................................................... 705/21
    See application file for complete search history.

(56) References Cited

U.S. PATENT DOCUMENTS

| 5,473,143 | A  | 12/1995 | Vak et al. |
| 6,874,126 | B1 | 3/2005  | Lapidous |
| 6,973,172 | B1 | 12/2005 | Bitove et al. |
| 7,386,485 | B1 | 6/2008  | Mussman et al. |
| 7,828,204 | B2 | 11/2010 | Fiebiger et al. |
| 7,832,646 | B1 | 11/2010 | Leason |
| 7,844,512 | B2 | 11/2010 | Richards et al. |
| 8,065,190 | B2 | 11/2011 | Collas et al. |
| 8,105,772 | B2 | 4/2012  | Mardikar et al. |
| 8,306,860 | B2 | 11/2012 | Dunsmore et al. |

(Continued)

FOREIGN PATENT DOCUMENTS

| CN | 103679475 | 3/2014 |
| EP | 2 533 186 | 12/2012 |

(Continued)

OTHER PUBLICATIONS

U.S. Appl. No. 16/808,220, John Cronin, NFC-Based Options Selection, filed Mar. 3, 2020.

(Continued)

*Primary Examiner* — Garcia Ade
(74) *Attorney, Agent, or Firm* — Polsinelli LLP

(57) ABSTRACT

The present invention communicates with a point of sale terminal using near field data communications and a purchase is either allowed or denied by a billing statement network according to a set of parameters.

19 Claims, 11 Drawing Sheets

(56) References Cited

U.S. PATENT DOCUMENTS

| | | |
|---|---|---|
| 8,474,701 B1 | 7/2013 | Meek et al. |
| 8,494,913 B2 | 7/2013 | Cavagnaro |
| 8,498,900 B1 | 7/2013 | Spirin et al. |
| 8,577,803 B2 | 11/2013 | Chatterjee et al. |
| 8,690,054 B1 | 4/2014 | Cummins et al. |
| 8,714,439 B2 | 5/2014 | Brendell et al. |
| 8,718,554 B2 | 5/2014 | Abel |
| 8,762,211 B2 | 6/2014 | Killian et al. |
| 8,783,561 B2 | 7/2014 | Wesley |
| 8,788,324 B1 | 7/2014 | Shetty et al. |
| 8,799,085 B2 | 8/2014 | Fisher |
| 8,805,726 B2 | 8/2014 | Fisher |
| 8,811,895 B2 | 8/2014 | Reisgies et al. |
| 8,954,004 B1 | 2/2015 | Wang et al. |
| 9,582,826 B2 * | 2/2017 | Caiman .............. G06Q 30/0639 |
| 9,646,303 B2 | 5/2017 | Karpenko et al. |
| 9,672,511 B2 | 6/2017 | Lim |
| 9,734,091 B2 * | 8/2017 | Kadi ...................... H04W 4/80 |
| 9,985,699 B1 | 5/2018 | Cronin |
| 9,990,621 B1 | 6/2018 | Ng et al. |
| 10,204,335 B1 | 2/2019 | Donavalli et al. |
| 10,262,311 B1 | 4/2019 | Cronin |
| 10,262,318 B1 | 4/2019 | Cronin |
| 10,348,368 B2 | 7/2019 | Cronin |
| 10,516,964 B2 | 12/2019 | Dotan et al. |
| 10,580,011 B1 | 3/2020 | Cronin |
| 10,679,207 B1 | 6/2020 | Huffines et al. |
| 10,944,448 B2 | 3/2021 | Cronin |
| 11,004,058 B2 | 5/2021 | Cronin |
| 2002/0026348 A1 | 2/2002 | Fowler et al. |
| 2002/0062249 A1 | 5/2002 | Iannacci |
| 2004/0010597 A1 | 1/2004 | Kirschner et al. |
| 2004/0220876 A1 | 11/2004 | Liu |
| 2005/0004839 A1 | 1/2005 | Bakker et al. |
| 2005/0210240 A1 | 9/2005 | Barron |
| 2006/0131390 A1 | 6/2006 | Kim |
| 2006/0206378 A1 | 9/2006 | Ficalora |
| 2007/0022375 A1 | 1/2007 | Walker |
| 2007/0032225 A1 | 2/2007 | Konicek et al. |
| 2007/0190939 A1 | 8/2007 | Abel |
| 2007/0192198 A1 | 8/2007 | Schwarzkopf |
| 2007/0203850 A1 | 8/2007 | Singh et al. |
| 2008/0011837 A1 | 1/2008 | Wesley |
| 2008/0078831 A1 | 4/2008 | Johnson et al. |
| 2008/0109335 A1 | 5/2008 | Keohane et al. |
| 2008/0120155 A1 | 5/2008 | Pliha |
| 2008/0133351 A1 | 6/2008 | White et al. |
| 2008/0147496 A1 | 6/2008 | Bal et al. |
| 2008/0150678 A1 | 6/2008 | Giobbi et al. |
| 2008/0167017 A1 | 7/2008 | Wentker et al. |
| 2008/0167961 A1 | 7/2008 | Wentker et al. |
| 2009/0082001 A1 | 3/2009 | Rahul et al. |
| 2009/0132362 A1 | 5/2009 | Fisher et al. |
| 2009/0138365 A1 | 5/2009 | Mueller et al. |
| 2009/0156190 A1 | 6/2009 | Fisher |
| 2009/0192935 A1 | 7/2009 | Griffin et al. |
| 2009/0276305 A1 | 11/2009 | Clopp |
| 2010/0010887 A1 | 1/2010 | Karlin et al. |
| 2010/0082455 A1 | 4/2010 | Rosenblatt et al. |
| 2010/0088149 A1 | 4/2010 | Sullivan et al. |
| 2010/0114677 A1 | 5/2010 | Carlson et al. |
| 2010/0124914 A1 | 5/2010 | Schmidt et al. |
| 2010/0125510 A1 | 5/2010 | Smith et al. |
| 2010/0190437 A1 | 7/2010 | Buhot |
| 2010/0211507 A1 | 8/2010 | Aabye et al. |
| 2010/0211679 A1 | 8/2010 | Kumar et al. |
| 2010/0274691 A1 | 10/2010 | Hammad et al. |
| 2010/0274853 A1 | 10/2010 | Carlson et al. |
| 2010/0309807 A1 | 12/2010 | Rautiainen |
| 2010/0312692 A1 | 12/2010 | Teicher |
| 2011/0016050 A1 | 1/2011 | Evans |
| 2011/0153438 A1 | 6/2011 | Dragt |
| 2011/0167133 A1 | 7/2011 | Jain |
| 2011/0202402 A1 | 8/2011 | Fowler et al. |
| 2011/0218849 A1 | 9/2011 | Rutigliano et al. |
| 2011/0230209 A1 | 9/2011 | Kilian |
| 2011/0238517 A1 | 9/2011 | Ramalingam et al. |
| 2011/0258249 A1 | 10/2011 | Biggs et al. |
| 2011/0276511 A1 | 11/2011 | Rosenberg |
| 2011/0313922 A1 | 12/2011 | Ben Ayed |
| 2011/0320345 A1 | 12/2011 | Taveau et al. |
| 2012/0036076 A1 | 2/2012 | Vanderwall et al. |
| 2012/0078701 A1 | 3/2012 | Woods |
| 2012/0078735 A1 | 3/2012 | Bauer et al. |
| 2012/0089461 A1 | 4/2012 | Greenspan |
| 2012/0101882 A1 | 4/2012 | Todd |
| 2012/0109730 A1 | 5/2012 | Yoder et al. |
| 2012/0136732 A1 | 5/2012 | McMillen et al. |
| 2012/0148077 A1 | 6/2012 | Aldaz et al. |
| 2012/0160912 A1 | 6/2012 | Laracey |
| 2012/0166332 A1 | 6/2012 | Naaman |
| 2012/0185315 A1 | 7/2012 | VanDerheide et al. |
| 2012/0209749 A1 | 8/2012 | Hammad et al. |
| 2012/0221401 A1 | 8/2012 | Brown et al. |
| 2012/0253913 A1 | 10/2012 | Richard |
| 2012/0330744 A1 | 12/2012 | Aissa |
| 2013/0006773 A1 | 1/2013 | Lutnick et al. |
| 2013/0006782 A1 | 1/2013 | Schwarzkopf et al. |
| 2013/0020389 A1 * | 1/2013 | Barnett .............. G06Q 20/3278 |
| | | 235/380 |
| 2013/0059534 A1 | 3/2013 | Sobalvarro et al. |
| 2013/0067546 A1 | 3/2013 | Thavasi et al. |
| 2013/0080241 A1 | 3/2013 | Fisher |
| 2013/0080972 A1 | 3/2013 | Moshrefi et al. |
| 2013/0085835 A1 | 4/2013 | Horowitz |
| 2013/0095755 A1 | 4/2013 | Moreton et al. |
| 2013/0097040 A1 | 4/2013 | Fisher |
| 2013/0110261 A1 | 5/2013 | Lee et al. |
| 2013/0110682 A1 | 5/2013 | Rosenblatt et al. |
| 2013/0132282 A1 | 5/2013 | Shakkarwar |
| 2013/0144715 A1 | 6/2013 | Kranzley et al. |
| 2013/0191213 A1 | 7/2013 | Beck et al. |
| 2013/0191246 A1 | 7/2013 | Calman et al. |
| 2013/0204728 A1 | 8/2013 | Lichterman et al. |
| 2013/0211987 A1 | 8/2013 | Louie et al. |
| 2013/0215467 A1 | 8/2013 | Fein et al. |
| 2013/0218682 A1 | 8/2013 | Alterman et al. |
| 2013/0256403 A1 | 10/2013 | MacKinnon |
| 2013/0268378 A1 | 10/2013 | Yovin |
| 2014/0006205 A1 | 1/2014 | Berry et al. |
| 2014/0006272 A1 | 1/2014 | Calman et al. |
| 2014/0058955 A1 | 2/2014 | Calman |
| 2014/0074637 A1 | 3/2014 | Hammad |
| 2014/0074691 A1 | 3/2014 | Bank et al. |
| 2014/0081855 A1 | 3/2014 | Hankins et al. |
| 2014/0089178 A1 | 3/2014 | Lee et al. |
| 2014/0089196 A1 | 3/2014 | Paya et al. |
| 2014/0089672 A1 | 3/2014 | Luna et al. |
| 2014/0100983 A1 | 4/2014 | Cavagnaro |
| 2014/0129357 A1 | 5/2014 | Goodwin |
| 2014/0138435 A1 | 5/2014 | Khalid |
| 2014/0172660 A1 | 6/2014 | Louie et al. |
| 2014/0173063 A1 | 6/2014 | Jeong et al. |
| 2014/0180826 A1 | 6/2014 | Boal |
| 2014/0189836 A1 | 7/2014 | Eyler |
| 2014/0201085 A1 | 7/2014 | Brendell et al. |
| 2014/0207680 A1 | 7/2014 | Rephlo |
| 2014/0214673 A1 | 7/2014 | Baca et al. |
| 2014/0222670 A1 | 8/2014 | Concannon |
| 2014/0274014 A1 | 9/2014 | Dodla |
| 2014/0277805 A1 | 9/2014 | Browne et al. |
| 2014/0279474 A1 | 9/2014 | Evans et al. |
| 2014/0298027 A1 | 10/2014 | Roberts et al. |
| 2014/0330654 A1 | 11/2014 | Turney et al. |
| 2014/0337151 A1 | 11/2014 | Crutchfield |
| 2014/0351057 A1 | 11/2014 | Kwon et al. |
| 2014/0351071 A1 | 11/2014 | Hong et al. |
| 2014/0351147 A1 | 11/2014 | Castrechini et al. |
| 2015/0019439 A1 | 1/2015 | Phillips |
| 2015/0073907 A1 | 3/2015 | Purves et al. |
| 2015/0088626 A1 | 3/2015 | Salmon et al. |
| 2015/0088631 A1 | 3/2015 | Mitchell |
| 2015/0095224 A1 | 4/2015 | Blythe |
| 2015/0100443 A1 | 4/2015 | Van Heerden et al. |

(56) References Cited

U.S. PATENT DOCUMENTS

| | | | |
|---|---|---|---|
| 2015/0100803 | A1 | 4/2015 | Chen et al. |
| 2015/0120473 | A1 | 4/2015 | Jung et al. |
| 2015/0127549 | A1 | 5/2015 | Khan |
| 2015/0154634 | A1 | 6/2015 | Chiu et al. |
| 2015/0156311 | A1 | 6/2015 | Adams et al. |
| 2015/0186871 | A1 | 7/2015 | Laracey |
| 2015/0220915 | A1 | 8/2015 | Rosenberg |
| 2015/0302398 | A1 | 10/2015 | Desai et al. |
| 2015/0339318 | A1 | 11/2015 | O'Toole et al. |
| 2015/0356551 | A1 | 12/2015 | Dogin et al. |
| 2016/0055512 | A1 | 2/2016 | Godsey et al. |
| 2016/0057619 | A1 | 2/2016 | Lopez |
| 2016/0117667 | A1 | 4/2016 | Kang et al. |
| 2016/0125414 | A1 | 5/2016 | Desai et al. |
| 2016/0162882 | A1 | 6/2016 | McClung |
| 2016/0192123 | A1 | 6/2016 | Lim |
| 2016/0275499 | A1 | 9/2016 | Gardiner et al. |
| 2016/0321641 | A1 | 11/2016 | Cady et al. |
| 2017/0024733 | A1 | 1/2017 | Purves |
| 2017/0287321 | A1 | 10/2017 | Ann et al. |
| 2017/0295032 | A1 | 10/2017 | Shin et al. |
| 2018/0041591 | A1 | 2/2018 | Yoden |
| 2018/0050450 | A1 | 2/2018 | Parrott et al. |
| 2018/0248589 | A1 | 8/2018 | Cronin |
| 2018/0374073 | A1 | 12/2018 | Zhao |
| 2019/0050895 | A1 | 2/2019 | Levy |
| 2019/0325426 | A1 | 10/2019 | Cronin |
| 2019/0326957 | A1 | 10/2019 | Cronin |
| 2020/0202362 | A1 | 6/2020 | Cronin |

FOREIGN PATENT DOCUMENTS

| | | |
|---|---|---|
| WO | WO 2012/051071 | 4/2012 |
| WO | WO 2013/096486 | 6/2013 |

OTHER PUBLICATIONS

Reuter, Thad; "NFC 'Add-On' Links Smart Phones, Contactless Pay", Paris Start-up Technology Vendor, ATM & Debit News. (Years: 2009).

"The Mobile Payments and NFC Landscape: A U.S. Perspective", A Smart Card Alliance Payments Council White Paper, Publication No. PC-11002 (Year: Sep. 2011).

U.S. Appl. No. 16/503,358 Office Action dated Jan. 7, 2020.
U.S. Appl. No. 14/970,311 Final Office Action dated Jun. 13, 2019.
U.S. Appl. No. 14/970,319 Final Office Action dated Jan. 28, 2019.
U.S. Appl. No. 14/970,338 Final Office Action dated Jan. 25, 2019.
U.S. Appl. No. 14/970,125 Final Office Action dated Jan. 28, 2019.
U.S. Appl. No. 14/970,139 Final Office Action dated Jan. 18, 2019.
U.S. Appl. No. 14/970,144 Final Office Action dated Jan. 7, 2019.
Airplus—Mobile Payment—How It Will Transform Corporate Travel and Expense Management, Apr. 18, 2012.
Case Study—Bill Splitting App for Restaurants, 2013.
AuthenTec—AuthenTec Fingerprint Technology Featured in Two New Fujitsu NFC-enabled Mobile Phones from NTT Docomo, Nov. 16, 2011.
Balaban, Dan; "Spanish Bank Installs 'First' Contactless ATMs", NFC Times, Apr. 5, 2011.
Blaze Mobile Wallet, Jan. 2008.
Boden, Rian; "PrivatBank cuts ATM costs with NFC", NFC World, Nov. 5, 2013.
Borison, Rebecca; "Google Wallet adds geolocated loyalty to iOS, combats Passbook", Mobile Commerce Daily, Feb. 7, 2014.
Carson, Biz; "BitPay brings one-touch payments to bitcoin with new NFC-compatible checkout app." Nov. 4, 2014.
Cluckey, Suzanne; "New guide offers a comprehensive view of ATM and mobile integration", Mobile Payments Today, Nov. 28, 2014.
CommBank Small Business app User Guide, CommonwealthBank. Jul. 11, 2014.
Dai, Weihui; "An Integrated Mobile Phone Payment System Based on 3G Network", Journal of Networks, vol. 6, No. 9, Sep. 2011.
Dragt, Bruce; "Universal Commerce: A Seamless, Personalized Purchase Experience for Today's Connected Consumers", A First Data White Paper, 2012.
Fraser, Jeff; "The Mobile Shopper: Lose Your Wallet." Jun. 1, 2014.
Girt Mobile—Mobile Application Development Ireland, Dec. 2, 2014.
Google Wallet Privacy Policy, Nov. 16, 2011.
Hoyos Labs, Nov. 28, 2014.
i-Free Unveils New and Improved "Wallet": NFC Mobile App Now Stores Contactless Transport Cards and Discount Coupons, i-Free News, Nov. 7, 2013.
FAQ and Support—CashCloud.com, Dec. 3, 2014.
Itautec Mobicash, Feb. 13, 2013. Link: https://youtu.be/-qaL2QHliok (youtube video, no pdf).
Khan, Vaseem; "Contactless card reader by Diebold leverages NFC technology at ATM's to give cash", NFC, Payments, Oct. 10, 2013.
Keane, Byran; "Key Takeaways From Money2020 Industry Conf", Deutsche Bank Markets Research. Oct. 10, 2013.
Lawler, Ryan; "Square's Order App Can Now Predict When You'll Arrive to Pick up Your Cappuccino", TechCrunch, Oct. 8, 2014.
Ma et al., Xiaohua; "The Architecture of Mobile Wallet System Based on NFC (Near Field Communication)", Research Journal of Applied Sciences, Engineering and Technology 7(12): 2589-2595, 2014, ISSN: 2040-7459; e-ISSN: 2040-7467, Mar. 29, 2014.
Mastin, Michelle; "Square vs.. Intuit GoPayment: Mobile Credit Card Systems Compared", BIZFEED, PCWorld, Sep. 6, 2011.
Mobile Commerce NFC Coupons and Loyalty Acceptance—Technical Proposal, Version 1.0, Jul. 1, 2014.
More Magic: Mobile Banking & Payment Applications, Nov. 30, 2014.
NEC—Integrated E-Money Solution, Jan. 20, 2014.
"New breed of ATM Visits Times Square", Mobileinfo.com, Issue #2001, Jul. 30, 2001.
NFC & Contactless—Mobile and card solutions, NFC & Mobile Money Summit, Oct. 14-17, 2013.
NFC ReTag Free—WidgApp Mobile Solutions Tools, Google Play, Jul. 17, 2014.
NFC White Paper—Alcatel-Lucent Mobile Wallet Service, Dec. 2011.
NXP—NFC for embedded applications: Your Critical link for the Internet of Things, Aug. 21, 2014.
Patni, Chandra; "Pouch NFC PayPass & PayWave Card Issuance, pouch-let your mobile pay!", www.yes-wallet.com, Apr. 13, 2012.
"Pay2You Places: shopping by geolocation", Connexions, Jul. 5, 2013.
Pourghomi et al., Pardis; "Cloud-based NFC Mobile Payments", Journal of Internet Technology and Secured Transactions (JITST), vol. 2, Issues 1/2/3/4, Mar.-Dec. 2013.
Pourghomi et al., Pardis; "A Proposed NFC Payment Application", International Journal of Advanced Computer Science and Applications, vol. 4, No. 8, 2013).
Reardon, Marguerite; Tibken, Shara; "Apple takes NFC maintstream on iPhone 6; Apple Watch with Apple Pay", CNET, Sep. 9, 2014.
Rodrigues et al., Helena; "MobiPag: Integrated Mobile Payment, Ticketing and Couponing Solution Based on NFC", Sensors 2014, 14, 13389-13415;ISSN 124-8220, Jul. 24, 2014.
Sreekumar, Shiny; "Biometric Authentication in Mobile Payments", Master Thesis, Information Management, Faculty of Computer Sciences, Sep. 2010.
Tamas, Fabian; "NFC-enabled Automated Teller Machine", Obuda University, NIK. Nov. 28, 2014.
TapWise—Near Field Communication (NFC) Services and Cloud-Based Tag Management, Dec. 1, 2014.
VoxLoc—Mastercard announces high level of success with biometric system. Sep. 23, 2014.
White Paper—Beyond the Hype: Mobile Payments for Merchants, 2013.
White Paper—Cloud Based Ticketing: Next Generation Fare Collection, Mar. 23, 2014.
White Paper—Mobile Commerce in Retail: Loyalty and Couponing, Jan. 2014.

(56) References Cited

OTHER PUBLICATIONS

White Pater—The Role of the Trusted Service Manager in Mobile Commerce, Dec. 2013.
Wollenhaupt, Gary; "Five Ways Mobile Technology will Revolutionize ATMs", White Paper—ATM MarketPlace, 2013.
U.S. Appl. No. 14/970,304 Final Office Action dated Oct. 1, 2018.
U.S. Appl. No. 14/970,304 Office Action dated Jan. 12, 2018.
U.S. Appl. No. 14/970,311 Office Action dated Apr. 4, 2018.
U.S. Appl. No. 14/970,314 Office Action dated Mar. 8, 2018.
U.S. Appl. No. 14/970,319 Office Action dated Jun. 26, 2018.
U.S. Appl. No. 14/970,328 Office Action dated Feb. 14, 2018.
U.S. Appl. No. 14/970,056 Final Office Action dated Nov. 2, 2018.
U.S. Appl. No. 14/970,056 Office Action dated Apr. 5, 2018.
U.S. Appl. No. 14/970,069 Office Action dated Mar. 28, 2018.
U.S. Appl. No. 14/970,080 Final Office Action dated Sep. 21, 2018.
U.S. Appl. No. 14/970,080 Office Action dated Feb. 26, 2018.
U.S. Appl. No. 14/970,091 Office Action dated Jun. 1, 2018.
U.S. Appl. No. 14/970,102 Final Office Action dated Nov. 30, 2017.
U.S. Appl. No. 14/970,102 Office Action dated May 1, 2017.
U.S. Appl. No. 15/967,068 Office Action dated Sep. 4, 2018.
U.S. Appl. No. 14/970,338 Office Action dated Jun. 28, 2018.
U.S. Appl. No. 14/970,340 Office Action dated Apr. 5, 2018.
U.S. Appl. No. 14/970,125 Office Action dated Jun. 29, 2018.
U.S. Appl. No. 14/970,139 Office Action dated May 31, 2018.
U.S. Appl. No. 14/970,144 Office Action dated May 17, 2018.
U.S. Appl. No. 14/970,311 Office Action dated Oct. 2, 2019.
U.S. Appl. No. 14/970,304 Office Action dated Jul. 12, 2019.
U.S. Appl. No. 14/970,319 Office Action dated Jul. 10, 2019.
U.S. Appl. No. 14/970,080 Office Action dated Aug. 15, 2019.
U.S Appl. No. 16/378,262, John Cronin, Transaction Modification Based on Real-Time Offers, filed Apr. 8, 2019.
U.S. Appl. No. 14/970,304, Final Office Action dated Apr. 9, 2020.
U.S. Appl. No. 14/970,311, Final Office Action dated Mar. 26, 2020.
U.S. Appl. No. 14/970,319, Final Office Action dated Apr. 6, 2020.
U.S. Appl. No. 14/970,080, Final Office Action dated May 7, 2020.
U.S. Appl. No. 16/378,262, Office Action dated Sep. 18, 2020.
U.S. Appl. No. 14/970,144, Office Action dated Oct. 16, 2020.
Alliance, Smart Card. "The mobile payments and NFC landscape: A US perspective." Smart Card Alliance (Sep. 2011): 1-53.
U.S. Appl. No. 14/970,304, Office Action dated Mar. 18, 2021.

* cited by examiner

User Device Statement Graphic User Interface (GUI)

Bank Statement

Account Summary
Account Number: XXXXXXXXXXXX

Previous Balance
Payment Credits
Purchases
NFC Purchases
Transfers
Fees
Interest
New Balance

Payment Information
Credit Card ending in: x5555
Debit Card Ending in: x4444
NFC on Bob's iPhone 6
NFC on Barbara's Android Tablet

Account Activity

| Date | Merchant Name or Transaction Description | ID | Device | GPS Location | $ Amount | View Image |
|---|---|---|---|---|---|---|
| 11-Nov | Starbuck's Coffe | XXXXXX1 | NFC - Bob's iPhone | [xx,yy] | $5.00 | image1 |
| 11-Nov | Shaw's Grocery | XXXXXX2 | NFC - Barbara's Android | [xx,yy] | $250 | image2 |
| 11-Nov | Exxon Mobil Gasoline | XXXXXX3 | Credit Card | N/A | $25.50 | N/A |
| 12-Nov | Denny's Diner | XXXXXX4 | Debit Card | N/A | $15.50 | N/A |

[ Download Statement to Quicken ]  [ View/Change NFC Rules ]  [ View NFC Map GUI ]

FIG. 4

SECURING CONTACTLESS PAYMENT

CROSS-REFERENCE TO RELATED APPLICATIONS

The present application claims the priority benefit of U.S. patent application Ser. No. 14/970,328 filed Dec. 15, 2015, which claims the priority benefit of U.S. provisional application No. 62/093,028 filed Dec. 17, 2014, the disclosures of which are hereby incorporated by reference.

BACKGROUND

Field of the Invention

The present invention generally relates to near field communications (NFC). More specifically, the present invention relates to a user of a user electronic device equipped with a near field data communication interface that performs financial transactions at point of sale terminals according to set of parameters configured at a billing statement network.

Description of the Related Art

Near field data communications (NFC) are currently being used by consumers to make secure financial transactions when purchasing goods or services. NFC is a standardized wireless data communication technology that communicates information over short distances. NFC commonly communicates using a frequency of 13.56 megahertz (MHz) with data rates approaching 424 kilo-bits per second (Kbps/sec). NFC equipped devices of various sorts are available in the marketplace today.

Users of NFC equipped devices currently cannot view a statement that identifies details of purchases made using their user device. Users of NFC data communication interface equipped user device are also currently without a way to setup rules that govern whether an item may be purchased by a particular user device using NFC data communications. Furthermore, there is no systematic way for users of a user device to keep track of NFC purchases with pictures and/or annotations made at the time of the purchase.

There is a need in the art for a system and method where a user device allows for identification, tracking, annotation, and photographing of information relating to purchases made using a near field data communication interface on a mobile device. Such a system and method would allow the user monitor purchase activity by viewing a statement, and would allow a user to regulate purchase activity of the user device according to a set of rules stored in a remote location.

SUMMARY OF THE PRESENTLY CLAIMED INVENTION

Embodiments of the present invention include a system and a method for tracking financial transactions using mobile electronic devices equipped with a near field communication (NFC) data communication interface. A method of the present invention may include a user entering information relating to a financial account into a graphical user interface displayed on a display at a mobile electronic device. The information entered may then be transmitted over a data communication interface to a billing statement network that responds by sending billing statement information back to the user device, and the billing statement information may then be received by the user device over the data communication interface. The billing statement information from the billing statement network may be displayed in a graphical user interface (GUI) on a display at the user device. In certain instances the billing statement information is displayed according to a set of settings or parameters set by the user of the user device at an earlier time. The billing statement information may also identify purchases that were purchased over a NFC data communication interface.

BRIEF DESCRIPTION OF THE DRAWINGS

FIG. 4 illustrates a bank statement graphical user interface (GUI) that may be displayed on a display at a user device.

DETAILED DESCRIPTION

Embodiments of the present invention include a system and a method for processing payments at private enterprises using mobile electronic devices equipped with near field data communication (NFC) functionality.

Mobile electronic devices described herein include, but are not limited to smartphones, iPhones, Android phones, iPads, notebook computers, computers built into a car, and mobile devices dedicated to performing NFC communications. Mobile devices may include a processor, and a memory. Mobile devices may also or alternatively include a field programmable gate array (FPGA), or a an application specific integrated circuit (ASIC).

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the figures and/or descriptions included herein.

A private payment network as described herein includes, but is not limited to a computer and a computer server.

Figure 1:
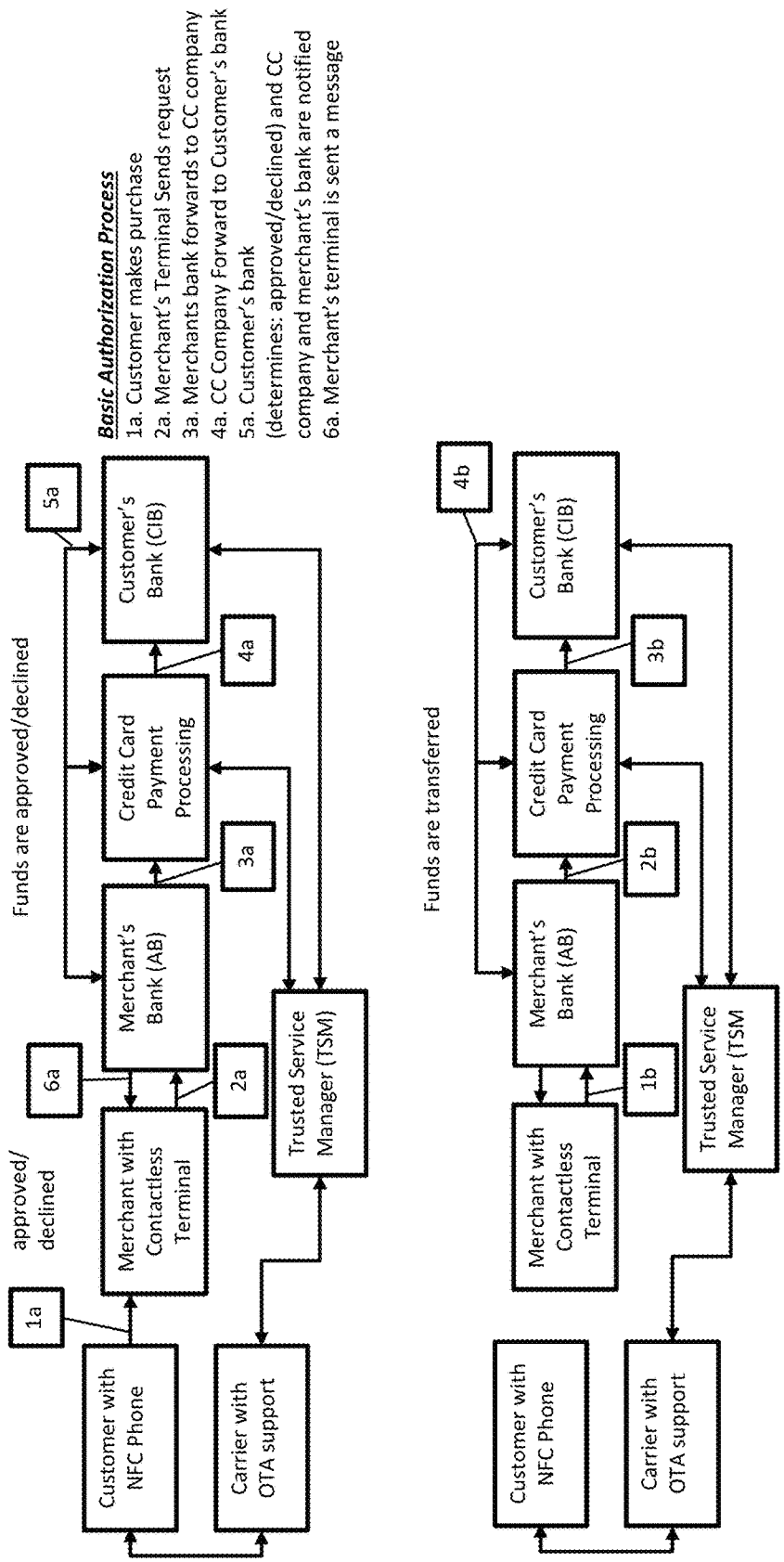
FIG. 1 illustrates a prior art basic authorization process and a basic prior art payment process.

FIG. 1 illustrates a prior art basic authorization process and a basic prior art payment process. FIG. 1 illustrates two separate flow charts, a first flow chart of a prior art basic authorization process, and a second flow chart of a basic prior art payment process. The basic authorization process begins with a customer with a phone that supports NFC communications sending a purchase order 1a to a merchant with a contactless terminal. The merchant with the contactless terminal then sends a request 2*a* to the merchant bank. Next the merchant bank forwards credit card information 3*a* provided with the purchase order to a credit card payment processing center. The credit card payment processing center then forwards the credit card information 4*a* to the customer bank, and the customer bank approves or declines the purchase 5*a*. Next a message is sent back to the merchant 6*a* indicating that the purchase has been approved or declined.

FIG. 1 also indicates that funds are approved or declined using a combination of the merchant bank, the credit card payment processing center, and the customer bank. FIG. 1 also depicts alternate communication pathways for performing the transactions. The alternative communication pathway includes a trusted service manager (TSM) communicating with the customer bank and with the credit card payment processing center. The TSM is an entity that serves a trusted intermediary between mobile devices, networks that service mobile devices, and software applications. The TSM securely coordinates payments from a financial institution to a merchant that have been authorized by a mobile device. The alternate pathway also includes a carrier with over the air (OTA) support communicating with the TSM and with the customer phone. Examples of a carrier with OTA support are cellular companies like Verizon, AT&T, and T-Mobile. The basic authorization process may be performed using older phone lines or it may be performed using modern wireless cellular networks.

The basic payment process of FIG. 1 illustrates the merchant sending a settlement request 1*b* to the merchant bank, the merchant bank then sends a settlement request 2*b* to the customer bank. Next the customer bank transfers funds to the merchant bank 4*b*. FIG. 1 shows that communications between the merchant bank, the credit card payment processing center, and the customer bank are used to transfer from the customer bank to the merchant bank. The basic payment flow chart also shows a customer phone communicating with a carrier with OTA support, and with a TSM. Here the TSM also communicates with the credit card payment system and with the customer bank.

Figure 2:
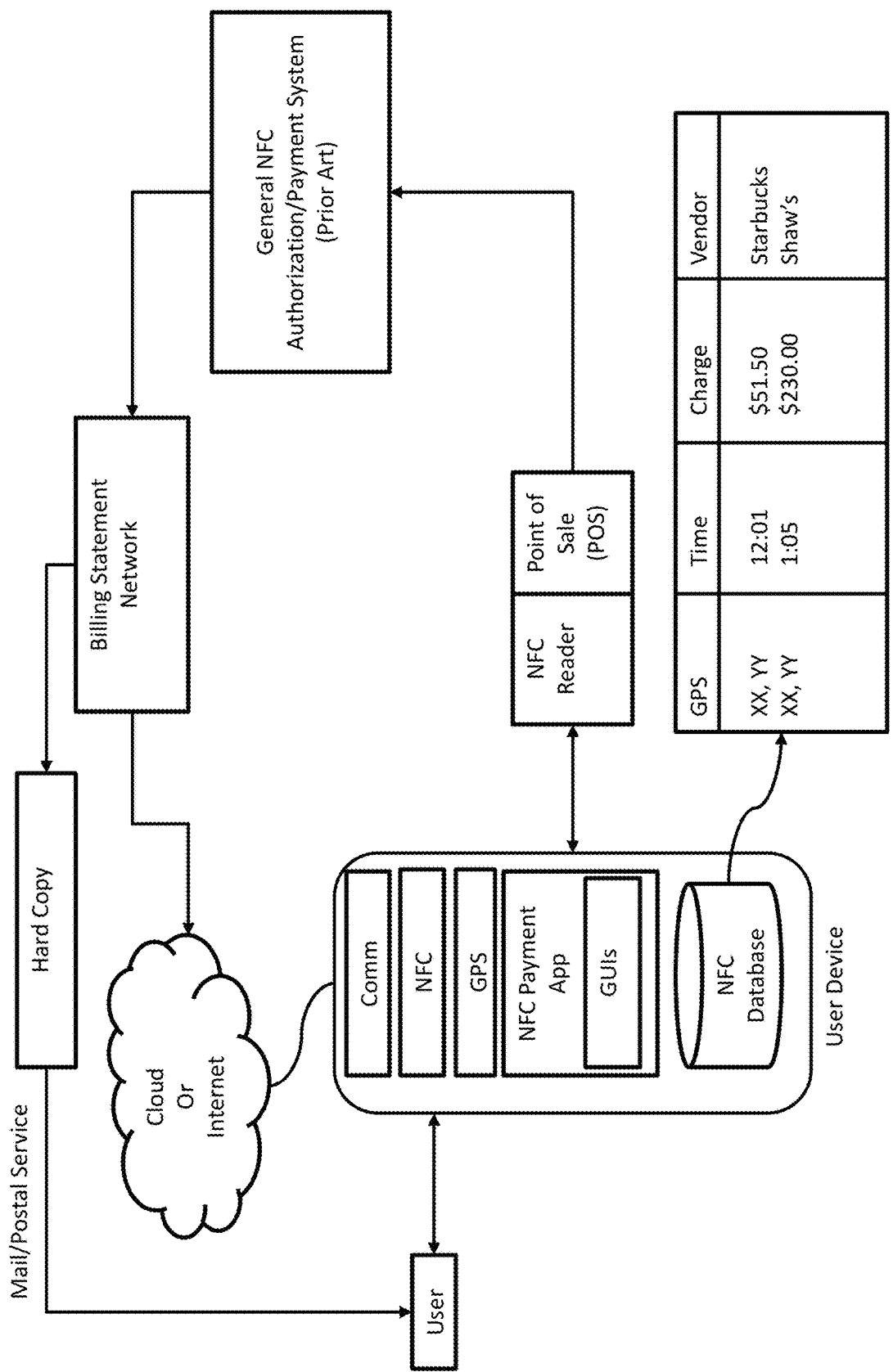
FIG. 2 illustrates a user device communicating with a billing statement network over the cloud or internet.

FIG. 2 illustrates a user device communicating with a billing statement network over the cloud or internet. The user device is depicted as communicating with a general NFC payment authorization system over a point of sale terminal. FIG. 2 also depicts the general NFC payment authorization system communicating with the billing statement network. The general NFC payment authorization system of FIG. 2 may be the same prior art general NFC payment authorization system depicted in FIG. 1. FIG. 2 also depicts a user interacting with the user device and the user receiving a hard copy of a statement from the billing statement network that was mailed to the user.

The user device includes a communication interface, a NFC data communication interface, a global positioning system (GPS), a NFC payment application (App) that includes a graphical user interface (GUI), and an NFC database. The NFC payment application may communicate with the NFC payment authorization system over the NFC data communication information and over a NFC data communication interface at the point of sale terminal.

The communication interface communicating over the cloud or internet may be any communication interface, including but not limited to Bluetooth, Wi-Fi (802.11), or a cellular 3G-4G LTE network. Other communications networks, protocols, and standards may be used. The NFC database is depicted as including historical information relating to financial transactions that the user has previously performed. For example, the database includes a transaction for the amount of $51.50 occurred at Starbucks at 12:01 pm at a GPS location (XX, YY).

In operation, the user device may communicate using NFC data communications with the point of sale terminal that in turn may communicate with the general payment authorization system that may communicate with the billing statement network when processing a transaction. The billing statement network may then communicate with the user device over the cloud or internet a communication relating to the transaction. The billing statement network may also arrange for a hard copy statement to be mailed to the user after the transaction is complete.

Figure 3:
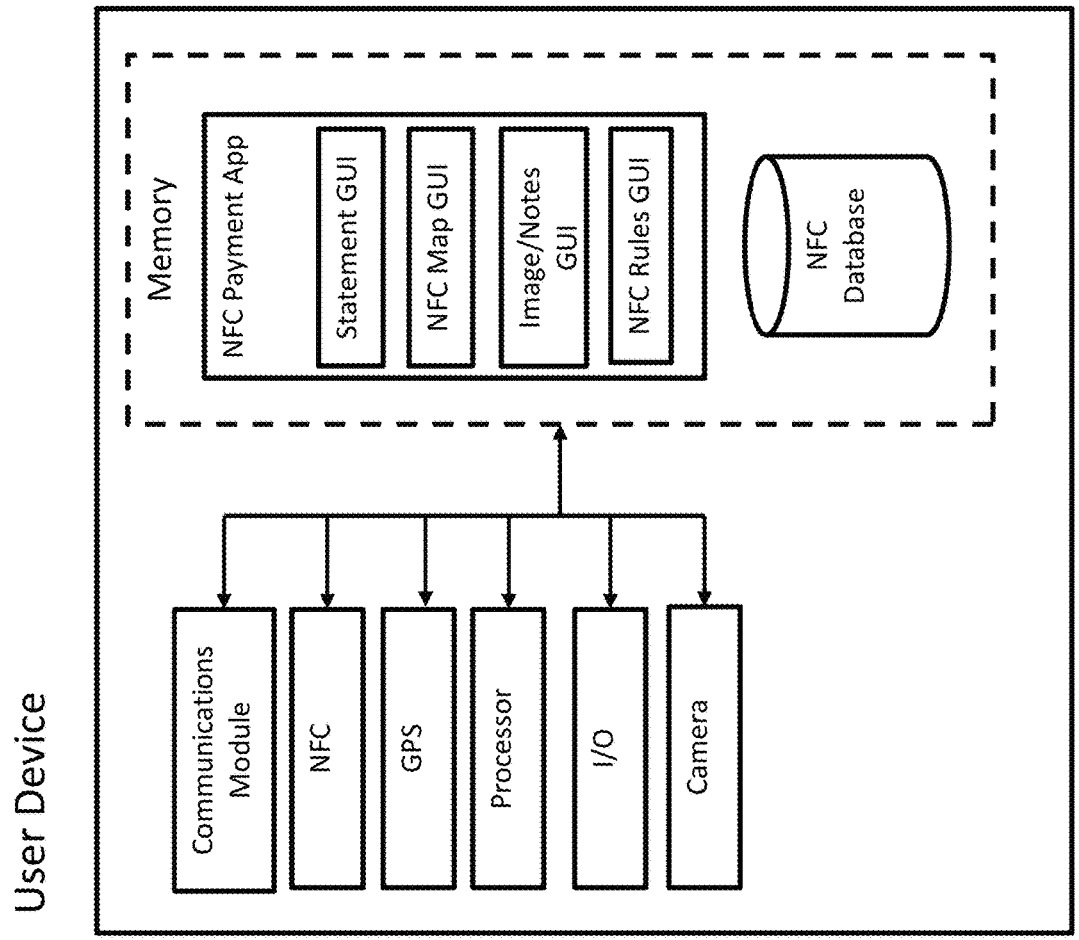
FIG. 3 illustrates a user device.

FIG. 3 illustrates a user device. The user device is depicted as including a memory, a communications module, an NFC data communication interface, a GPS system, a processor, an input/output (I/O) interface, and a camera connected with a communication bus. The memory in the user device is depicted as including an NFC payment App, and an NFC database. The NFC payment App includes a statement GUI, a NFC map GUI, an image/notes GUI, and a NFC rules GUI. The various GUIs depicted in FIG. 3 may be used by a user to order or review a statement, review a map, make notes or images, or review NFC rules.

FIG. 4 illustrates a bank statement graphical user interface (GUI) that may be displayed on a display at a user device. The bank statement includes an account summary information, payment information, account activity information, and several selection boxes. The selection boxes depicted include download statement to quicken, view/change NFC rules, and view an NFC map GUI.

The account summary includes an account balance, credits, purchase information, NFC purchase history information, transfer information, interest earned, and a new balance. The payment information includes a partial credit card number, a partial debit card number, and previous payment history (i.e., NFC on Bob iPhone 6). The account activity includes a plurality of fields that include: a transaction date, a merchant name, a transaction identifier (ID), a device name, a GPS location, a transaction amount, and an optional image. The statement tracks transactions performed at various merchants and cross references a device name that was used to perform the transaction with other information. Image information may be a photo taken at the time that the transaction occurred. An example transaction occurred on November 12 at Dennys diner using a debit card for an amount of $15.50. Since this transaction was processed using a debit card, no GPS location data or image data is available. In contrast, a second example transaction that occurred on November 11 at Shaw grocery was processed using a NFC communication interface on Barbara Android phone. This second example transaction occurred at GPS location (xx, yy) and includes image data.

Statement information may be downloaded to quicken accounting software when the download statement to quicken selection box is selected. A user may view or change rules that enable, disable, or configure NFC communications at the user device. A user may also view the NFC map GUI by selecting the view NFC map GUI selection box.

Figure 5:
FIG. 5 illustrates an image captured by a user device that may be displayed in an image/notes GUI.

FIG. 5 illustrates an image captured by a user device that may be displayed in an image/notes GUI. FIG. 5 also depicts an example of a user device NFC rules GUI. The image displayed in the user device image/notes GUI is a grocery cart full of groceries. Purchase information in the image/notes GUI indicates that the groceries were purchased at Shaw groceries, a charge of $250.00, and a note of "ingredients for dinner and desert." The button depicted in the image/notes GUI may be used to acquire an image and store that image in a database.

The user device NFC rules GUI indicates that allowed NFC devices are Bob iPhone 6, and Barbara Android tablet. FIG. 5 depicts a charge limit of $1000.00 per month rule. This rule may limit NFC charges of a user configured amount spanning a time selected by the user in the GUI. The rules GUI also depicts selection boxes "do not allow NFC payments at these locations," "allow vendors to send me coupons related to NFC," and "do not allow NFC payments over this amount $500.00." FIG. 5 also includes an entry box that may be used to identify location where NFC payments should not be allowed. Thus, a user of the user device may define rules regarding how and where NFC data communications may be used by one or more user devices.

Figure 6:
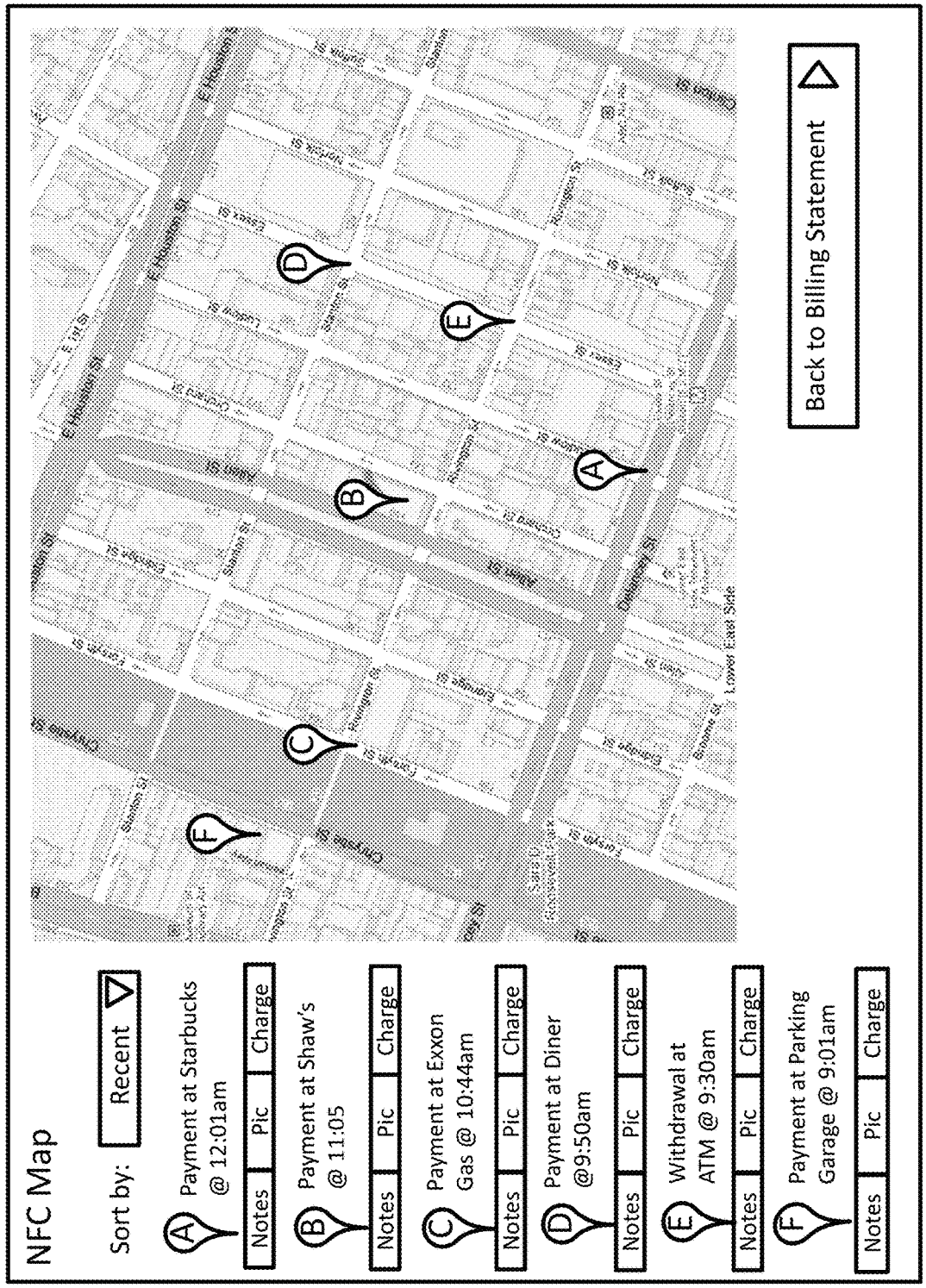
FIG. 6 illustrates a map that identifies locations where a user made a purchase using NFC data communications in a user device NFC map GUI.

FIG. 6 illustrates a map that identifies locations where a user made a purchase using NFC data communications in a user device NFC map GUI. FIG. 6 depicts numerous recent purchase locations (A-F). FIG. 6 depicts a vendor name, and a time when each purchase was made. Each entry in the map is also cross referenced to notes that may have been entered, to a picture (pic) that may have been taken at the purchase location, and to a charge charged at the location. For example, location D identifies that a payment was made at a diner at 9:50 am. By selecting a notes, a pic, or a charge selection box under the location identifier D, a user may view a note, view a picture, or review a charge made at location D. The map also includes selection boxes sort by and back to billing statement. Selection box "sort by" identifies that only recent purchase are displayed in the map. Selection box "back to billing statement," when selected will allow a user to go back and view a billing statement, which may be like the billing statement depicted in FIG. 4.

Figure 7:
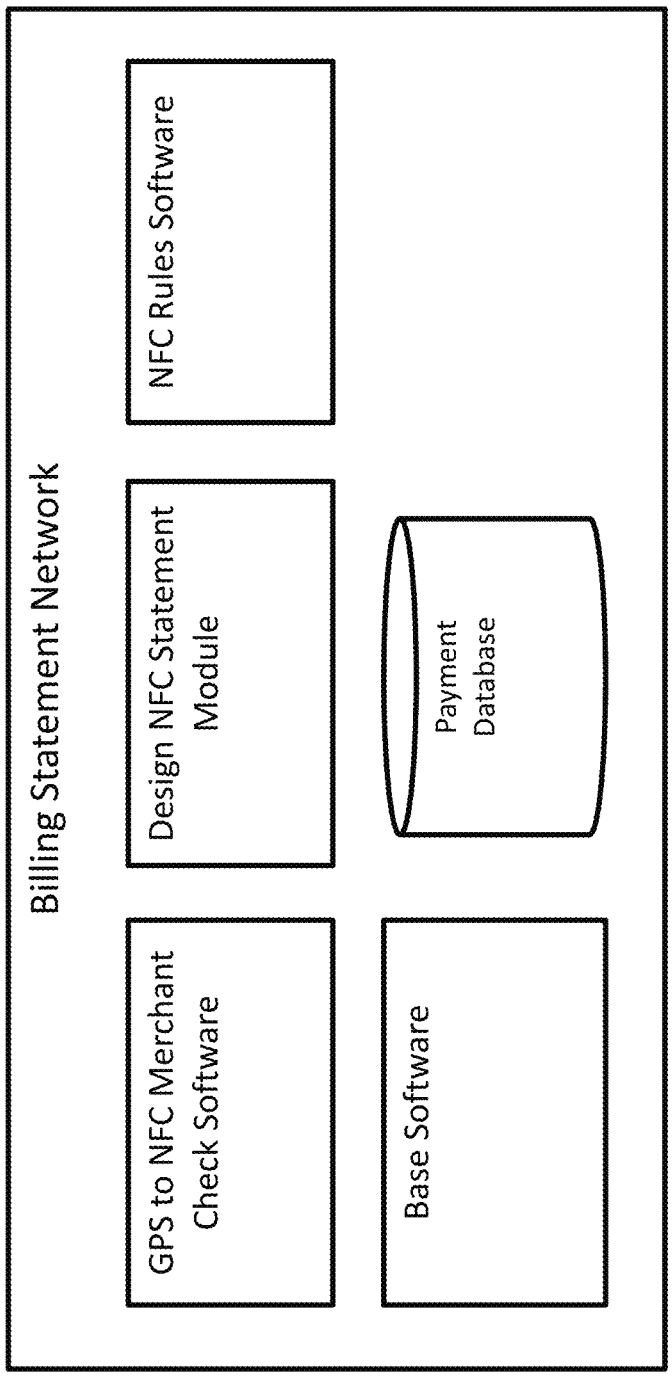
FIG. 7 illustrates a billing statement network.

FIG. 7 illustrates a billing statement network. The billing statement network in FIG. 7 includes a GPS to NFC merchant check software, base software, design NFC statement module, a NFC rules software, and a payment database.

The GPS to merchant check software may check the GPS location of a user device and a merchant to see if they are in the same location when authorizing a purchase. The base software in FIG. 6 provides the billing statement network with basic billing functions.

The design statement module is a software module that may allow a user to customize how their billing statements appear. For example, a user may configure their statement to include an icon of an image acquired during purchases in the statement when an image is available. The NFC rules software is a software module that may enforce rules setup by a user of the user device. The rules GUI as discussed in respect to FIG. 5 provides examples of rules that may be enforced by the NFC rules software.

Finally, the payment database in FIG. 7 is a database that includes purchase information, such as the purchase information discussed in respect to FIGS. 2, 5, and 6.

Figure 8:
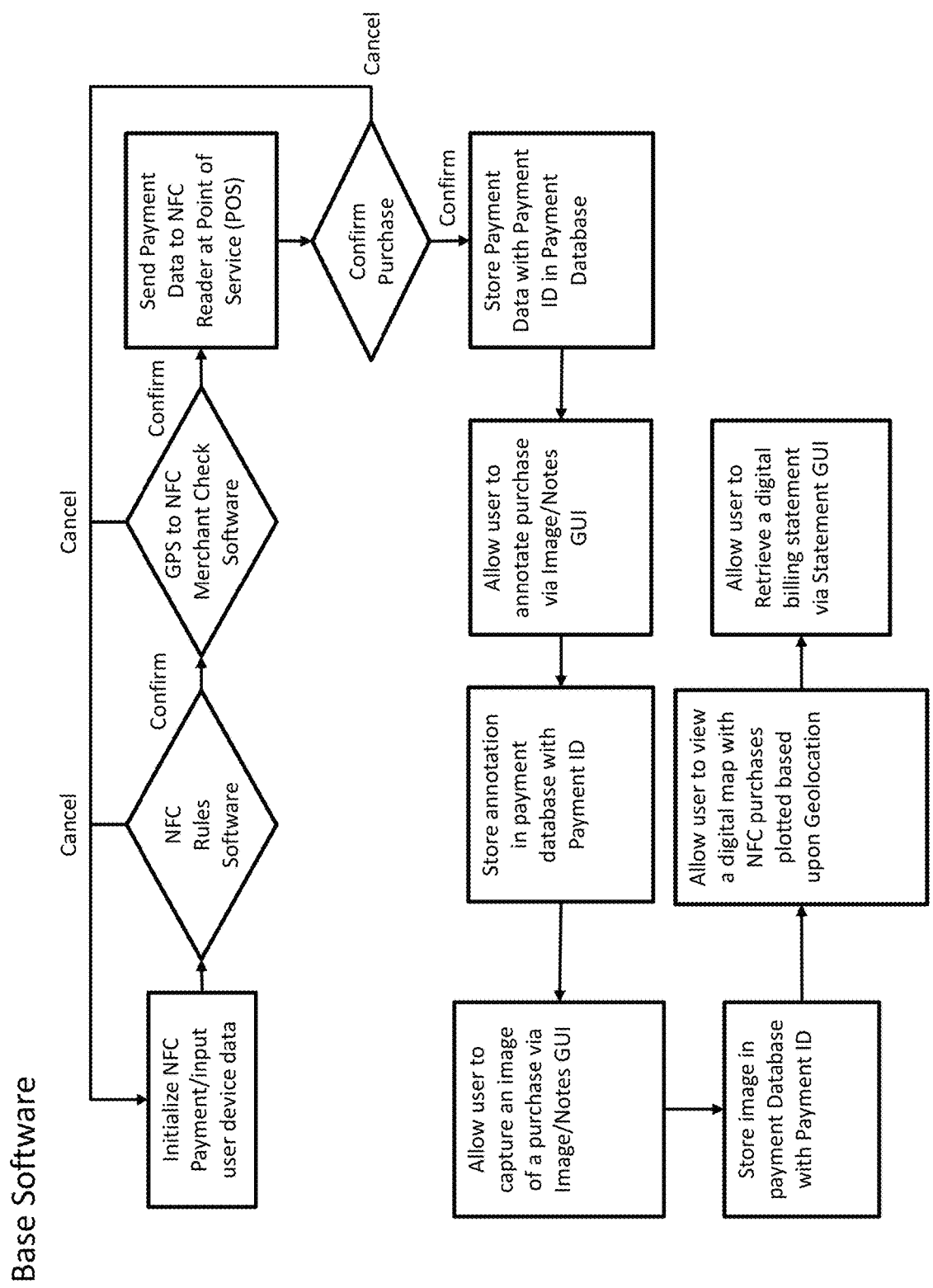
FIG. 8 illustrates an exemplary flow chart of functionality that may be included in a base software of a billing statement network.

FIG. 8 illustrates an exemplary flow chart of functionality that may be included in a base software of a billing statement network. A first step in the flow chart is a step that may enable NFC payments inputs to be input (initialized) in the base software. The second step in FIG. 8 is a first determination step, this step determines whether a transaction input into the base software conforms to rules in set in the rules software. When the transaction does conform to the rules, the flow chart moves to a third step in the flow chart, otherwise the transaction is cancelled.

The third step in FIG. 8 is a second determination step, where a geo-location of the merchant is checked against a geo-location of the user device. When the geo-locations match, the flow chart proceeds to a fourth step in the flow chart, otherwise the transaction is cancelled (as the transaction appears to be a fraudulent transaction). In step four of the flow chart payment data a user device sends payment information over a point of sale terminal to a point of sale service (POS). A geo-location may be a street address or correspond to a latitude and a longitude.

Next in a fifth step of the flowchart a third determination is determined. The third determination step may determine that the purchase should be processed. When it is confirmed that the purchase should be processed, program flow flows to a sixth step in FIG. 8, otherwise the transaction is cancelled. In the sixth step of the flowchart payment data and a payment identifier (ID) are stored in a payment database. Then in a seventh step, a user may be allowed to annotate the purchase and enter an image using the image/notes GUI in FIG. 5. In an eight step of FIG. 8 the annotation is stored in the payment database.

Next in step nine of the flow chart as illustrated in FIG. 8, the user is allowed to capture an image that may be stored in the database and cross referenced to the purchase, to the purchase ID, and to any notes or images captured relating to the purchase. After the image is captured it may be stored in the payment database in step ten of the flow chart.

In an eleventh step of the flow chart, the user may be allowed to view NFC purchases made on a digital map displayed in a GUI at the user device. The map may include the geo-location where the purchase was made. Finally, in a twelfth step of the flow chart, a user may retrieve a billing statement and view that statement in a statement GUI.

Figure 9:
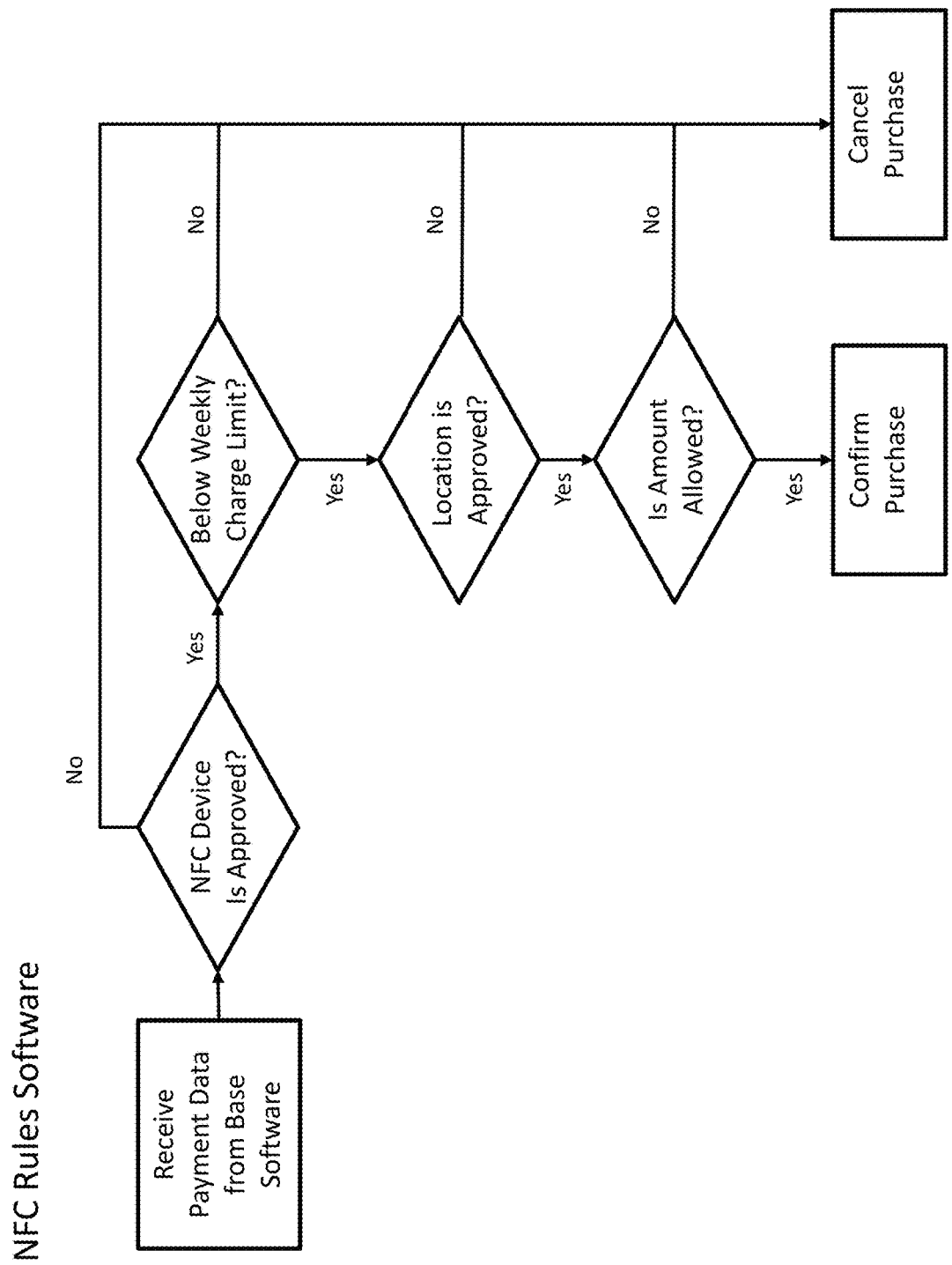
FIG. 9 illustrates an exemplary flow chart of NFC rules software.

FIG. 9 illustrates an exemplary flow chart of NFC rules software. A first step in the flow chart may receive payment data from base software at the billing statement network of FIG. 7. A second step in the flow chart is a determination step where the NFC device may be approved to execute a transaction. When the NFC device may perform a transaction, program flow flows to a third step in the flow chart, otherwise the transaction moves to a step where the purchase is cancelled. The third step in the flow chart determines whether the purchase history associated with the mobile device is below a weekly charge limit, when yes, program flow moves to a fourth step in the flow chart, otherwise program flow moves to the step where the purchase is cancelled.

The fourth step of the flow chart determines whether the location where the purchase is being performed is an approved location, when yes, program flow moves to a fifth step of the flow chart. When the location is an approved location, program flow moves to a fifth step of the flow chart, otherwise program flow moves to the step where the purchase is cancelled. The fifth step in the flow chart determines whether the amount or cost of the purchase is an allowed amount. When the amount is an allowed amount, program flow flows to a sixth step in the flow chart where the purchase is confirmed. When the amount is not allowed program flow moves from the fifth step to the step where the purchased is cancelled.

Figure 10:
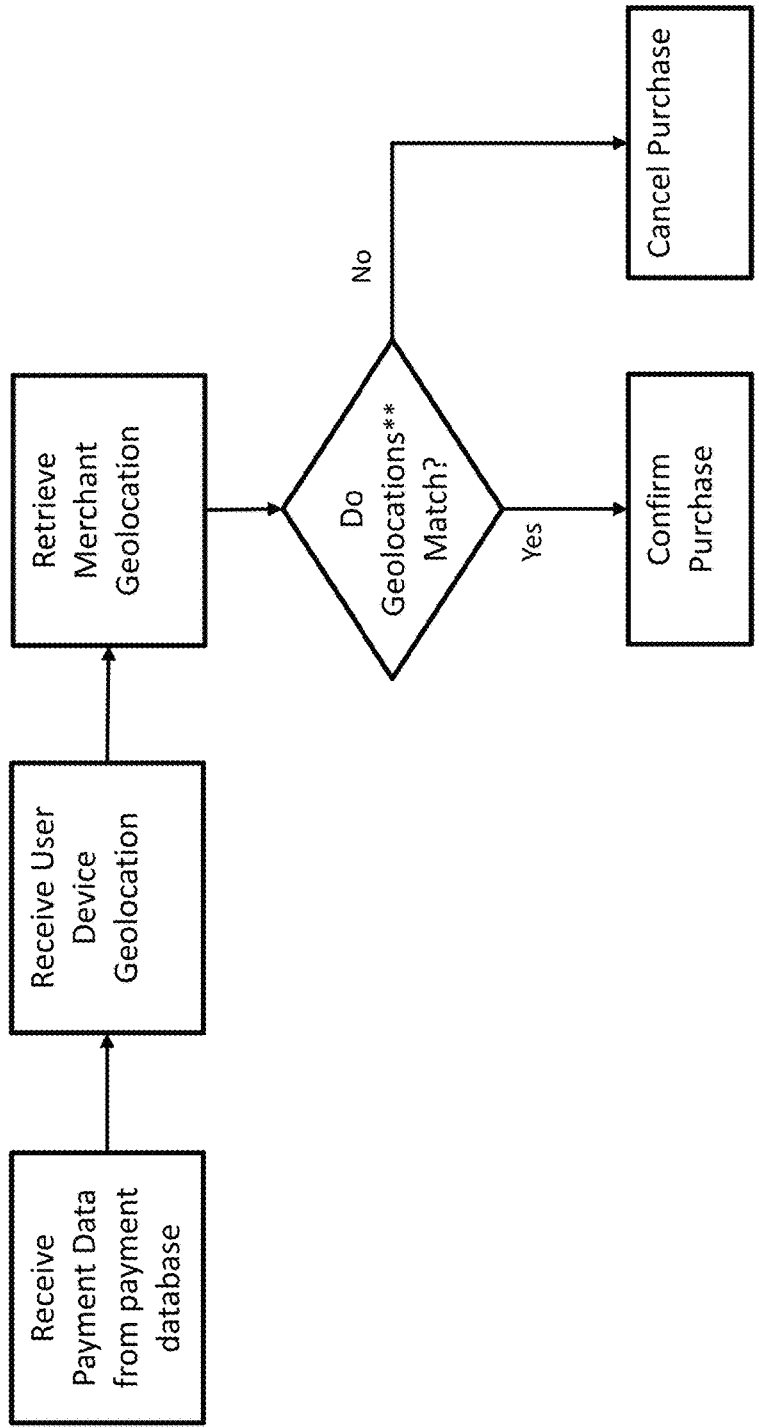
FIG. 10 illustrates an exemplary flow chart of GPS to NFC merchant check software.

FIG. 10 illustrates an exemplary flow chart of GPS to NFC merchant check software. FIG. 10 begins with a first step where payment data is received from the payment database at the billing statement database. In a second step of the flow chart the geo-location of the user device is received, and then the geo-location of the merchant is retrieved in a third step of the flow chart. Next the merchant check software may determine whether the geo-location of the user device matches the geo-location of the merchant.

When the geo-location match, the purchase is confirmed in a fifth step of the flow chart. When the geo-locations do not match, the purchase is cancelled in a sixth step of the flow chart.

Figure 11:
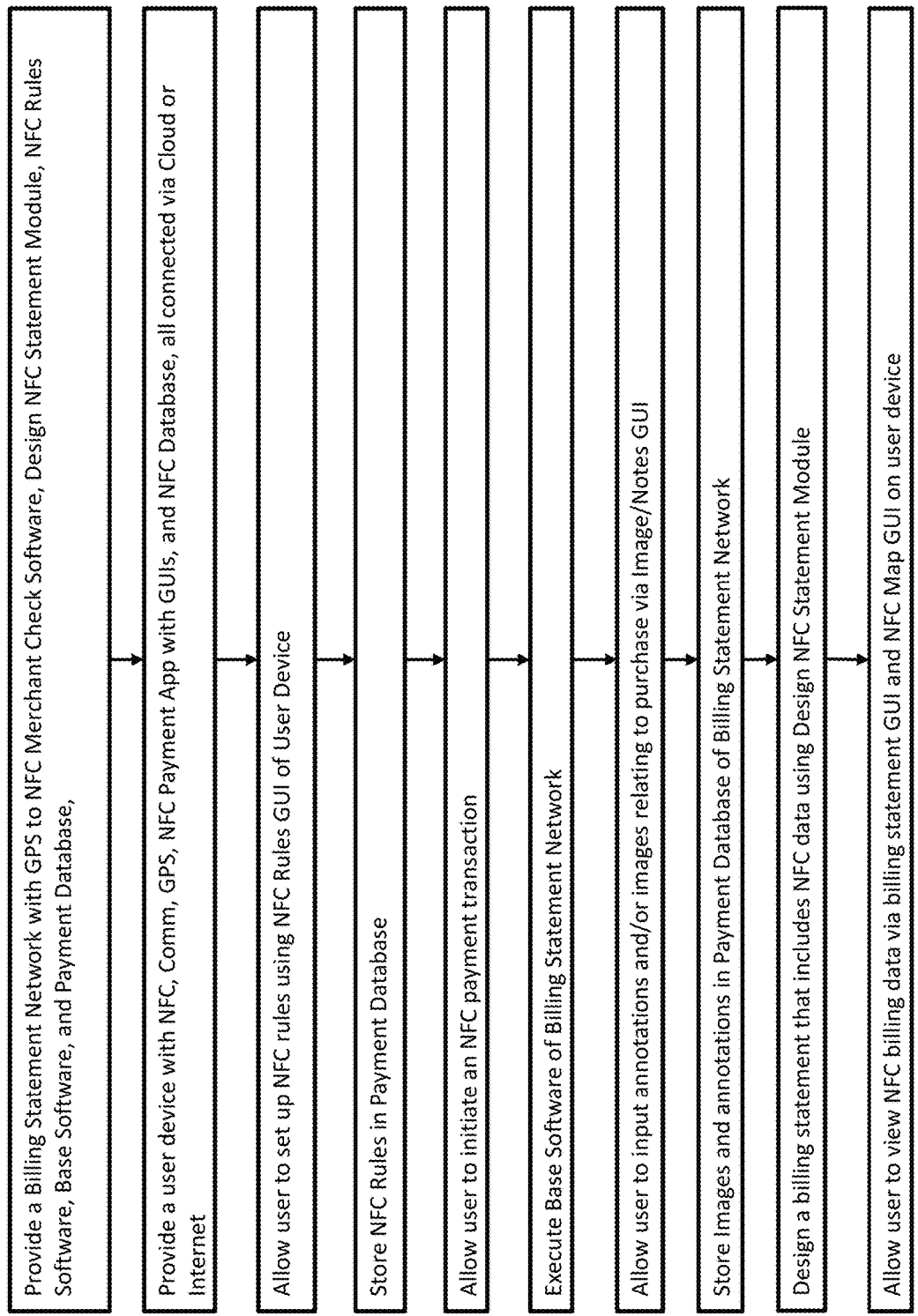
FIG. 11 illustrates an exemplary method corresponding to the present invention.

FIG. 11 illustrates an exemplary method corresponding to the present invention. The method begins with a first providing step where a billing statement network may be provided with GPS merchant check software, design NFC statement module software, NFC rules software, base software, and a payment database.

The second step of the flow chart is also a providing step where a user device may be provided with a NFC communication interface, another communication interface, a GPS system, an NFC payment App and GUIs, and an NFC database. In the second step of the flow chart, a user device may communicate over the cloud or internet with the billing statement network of FIG. 2.

The third step of the flow chart may allow a user to setup NFC rules in the billing statement network over a GUI displayed on a display at the user device. Then in a fourth step of the flow chart the NFC rules may be stored in a payment database at the billing statement network. Next in a fifth step of the flow chart, the user may be allowed to initiate an NFC payment transaction.

The sixth step of the flow chart is where base software at the billing statement network may be executed. Then in a seventh step, the user may be allowed to input annotations or images relating to the purchase over an image/notes GUI at the user device. The eighth step of the flow chart is where the images and/or the annotations input in step seven may be stored in the payment database of the billing statement network.

In step nine of FIG. 11, a user of the user device may design a billing statement by interacting with the billing module software at the billing statement network. Here again this interaction may be performed over a GUI at the user device.

Finally, in step ten of the flow chart a user may be allowed to view a billing statement sent from the billing statement network. The statement may be viewed over a billing GUI or a map GUI on the user device.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for securing contactless transactions, the method comprising:
    receiving a wireless data communication from a contactless terminal, the received wireless data communication including a requested contactless transaction involving a user device, the wireless data communication received via contactless interface of the user device;
    identifying a current GPS location of the user device via a global positioning system (GPS) at a time that the contactless transaction is requested by the wireless data communication; and
    transmitting information regarding the requested contactless transaction and the identified current GPS location over a communication network to a network server, wherein the network server further identifies a merchant location associated with the requested contactless transaction, and conditions approval of the requested contactless transaction on the current GPS location of the user device matching the merchant location at the time that the contactless transaction is requested.

2. The method of claim 1, further comprising:
    receiving a request for a contactless transactions statement associated with an account of the user device, wherein the request is sent to the network server; and
    generating a display of the requested contactless transactions statement on a screen of the user device based on a response sent from the network server, wherein the generated contactless transactions statement includes the requested contactless transaction among a plurality of contactless transactions.

3. The method of claim 2, wherein the contactless transactions statement includes a map that illustrates the merchant location where the requested contactless transaction was made and one or more other locations where other contactless transactions were made.

4. The method of claim 2, wherein the received request specifies a time period, and wherein the display further comprising identifying that other contactless transactions fall into the specified time period.

5. The method of claim 1, further comprising storing one or more rules for contactless transactions in memory, and wherein approval of the requested contactless transaction is further based on compliance with the stored rules.

6. The method of claim 5, wherein at least one of the rules specifies a location where contactless transactions are not allowed, and wherein approval of the requested contactless transaction is further based on identifying that the current GPS location is not at the specified location.

7. The method of claim 5, wherein at least one of the rules specifies an amount above which contactless transactions are not allowed, and wherein approval of the requested contactless transaction is further based on identifying that an amount of the requested contactless transaction does not exceed the specified amount.

8. The method of claim 7, wherein the at least one rule further specifies a time period, and wherein approval of the requested contactless transaction is further based on identifying that a total amount of contactless transactions made within the specified time period does not exceed the specified amount.

9. The method of claim 5, wherein at least one of the rules specifies a set of devices that are allowed to make contactless transactions, and wherein approval of the requested contactless transaction is further based on identifying that the user device is part of the specified set.

10. A device for securing contactless transactions, the device comprising:
    a contactless interface comprising a radio frequency antenna that receives a wireless data communication from a contactless terminal, the received wireless data communication including a requested contactless transaction ;
    a global positioning system (GPS) coupled to the contactless interface, wherein the GPS identifies a current GPS location at a time that the contactless transaction is requested by the wireless data communication; and a communication interface coupled to the contactless interface and the GPS, wherein the communication interface transmits information regarding the requested contactless transaction and the identified current GPS location over a communication network to a network server, wherein the network server further identifies a merchant location associated with the requested contactless transaction , and conditions approval of the requested contactless transaction on the current GPS location matching the merchant location at the time that the contactless transaction is requested.

11. The device of claim 10, further comprising a user device that:

receives a request for a contactless transactions statement associated with an account of the user device, wherein the request for the contactless transactions statement is sent to the network server, and displays the requested contactless transactions statement on a screen of the user device based on a response sent from the network server, wherein the displayed contactless transactions statement includes the requested contactless transaction among a plurality of contactless transactions.

12. The device of claim 11, wherein the contactless transactions statement includes a map that illustrates the merchant location where the requested contactless transaction was made and one or more other locations where other contactless transactions were made.

13. The device of claim 11, wherein the received request specifies a time period, and further comprising identifying that other contactless transactions fall into the specified time period.

14. The device of claim 10, further comprising memory that stores one or more rules for contactless transactions, and wherein approval of the requested contactless transaction is further based on compliance with the stored rules.

15. The device of claim 14, wherein at least one of the rules specifies a location where contactless transactions are not allowed, and wherein approval of the requested contactless transaction is further based on identifying that the current GPS location is not at the specified location.

16. The device of claim 14, wherein at least one of the rules specifies an amount above which contactless transactions are not allowed, and wherein approval of the requested contactless transaction is further based on identifying that an amount of the requested contactless transaction does not exceed the specified amount.

17. The device of claim 16, wherein the at least one rule further specifies a time period, and wherein approval of the requested contactless transaction is further based on identifying that a total amount of contactless transactions made within the specified time period does not exceed the specified amount.

18. The device of claim 14, wherein at least one of the rules specifies a set of devices that are allowed to make contactless transactions, and wherein approval of the requested contactless transaction is further based on identifying that the device is part of the specified set.

19. A non-transitory computer-readable storage medium, having embodied thereon a program executable by a processor to perform a method for securing contactless transactions, the method comprising:

receiving a wireless data communication from a contactless terminal, the received wireless data communication including a requested contactless transaction involving a user device, the wireless data communication received via an contactless interface of the user device;

identifying a current GPS location of the user device via a global positioning system (GPS) at a time that the contactless transaction is requested by the wireless data communication; and transmitting information regarding the requested contactless transaction and the identified current GPS location over a communication network to a network server, wherein the network server further identifies a merchant location associated with the requested contactless transaction, and conditions approval of the requested contactless transaction on the current GPS location of the user device matching the merchant location at the time that the contactless transaction is requested.

* * * * *